(12) United States Patent
Uehara et al.

(10) Patent No.: US 8,281,847 B2
(45) Date of Patent: Oct. 9, 2012

(54) ROLL-UP SHADE APPARATUS FOR VEHICLE

(75) Inventors: Tatsuaki Uehara, Tochigi (JP);
Yoshikazu Ikeda, Tochigi (JP);
Hisanori Fukuda, Tochigi (JP);
Teruyuki Nakamura, Tochigi (JP);
Tsutomu Iwaya, Tochigi (JP)

(73) Assignee: Yachiyo Industry Co., Ltd., Saitama (JP)

( * ) Notice: Subject to any disclaimer, the term of this patent is extended or adjusted under 35 U.S.C. 154(b) by 176 days.

(21) Appl. No.: 12/888,833

(22) Filed: Sep. 23, 2010

(65) Prior Publication Data

US 2011/0067826 A1  Mar. 24, 2011

(30) Foreign Application Priority Data

Sep. 24, 2009 (JP) .................................. 2009-218466
Aug. 27, 2010 (JP) .................................. 2010-190370

(51) Int. Cl.
*B60J 3/00* (2006.01)
(52) U.S. Cl. .................... 160/370.22; 160/265; 296/97.8
(58) Field of Classification Search .................. None
See application file for complete search history.

(56) References Cited

U.S. PATENT DOCUMENTS

| | | | | |
|---|---|---|---|---|
| 503,037 A * | 8/1893 | Crisson | ......................... | 160/274 |
| 516,603 A * | 3/1894 | King | ............................ | 160/274 |
| 554,552 A * | 2/1896 | Turnbull | ....................... | 160/247 |
| 1,033,224 A * | 7/1912 | Andlauer | ....................... | 160/274 |
| 4,887,660 A * | 12/1989 | Kraus | ............................ | 160/265 |
| 6,899,380 B2 * | 5/2005 | Kralik et al. | ................... | 296/214 |
| 7,568,752 B1 * | 8/2009 | Lin | ............................... | 296/97.8 |
| 2005/0051283 A1 * | 3/2005 | Chatellard et al. | ............ | 160/265 |
| 2005/0236117 A1 * | 10/2005 | Lin | ............................. | 160/267.1 |
| 2007/0056696 A1 * | 3/2007 | Lin | ............................. | 160/273.1 |
| 2008/0006373 A1 * | 1/2008 | Lin | ............................. | 160/321 |
| 2011/0067826 A1 * | 3/2011 | Uehara et al. | .................. | 160/314 |

FOREIGN PATENT DOCUMENTS

JP     2000-272341 A     10/2000

\* cited by examiner

*Primary Examiner* — Blair M. Johnson
(74) *Attorney, Agent, or Firm* — Arent Fox LLP

(57) ABSTRACT

There is provided a roll-up shade apparatus which can ensure a larger open dimension of a shade. The roll-up shade apparatus comprises a pair of first wire drums which travel and rotate in a wire wind-up direction or a wire feed direction when the shade is moved in the open direction or the closing direction, a pair of second wire drums which are coupled to a retractor so as to be rotatable together with the retractor, and which are rotatably provided at both sides of the retractor coaxially therewith so that a wire wind-up direction becomes opposite to a shade wind-up direction of the retractor, and a pair of wires suspended between the respective first and second wire drums so that the second wire drums rotate in a wire feed direction or in a wire wind-up direction when the first wire drums rotate in the wire wind-up direction or in the wire feed direction, respectively.

16 Claims, 9 Drawing Sheets

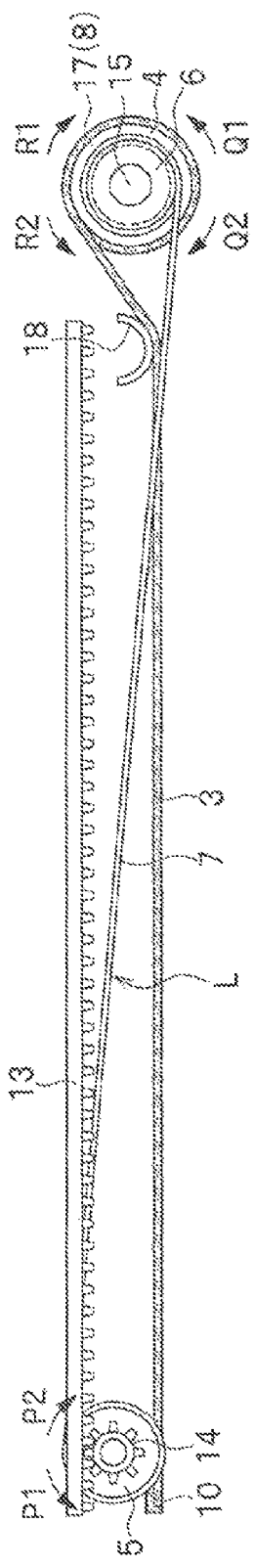
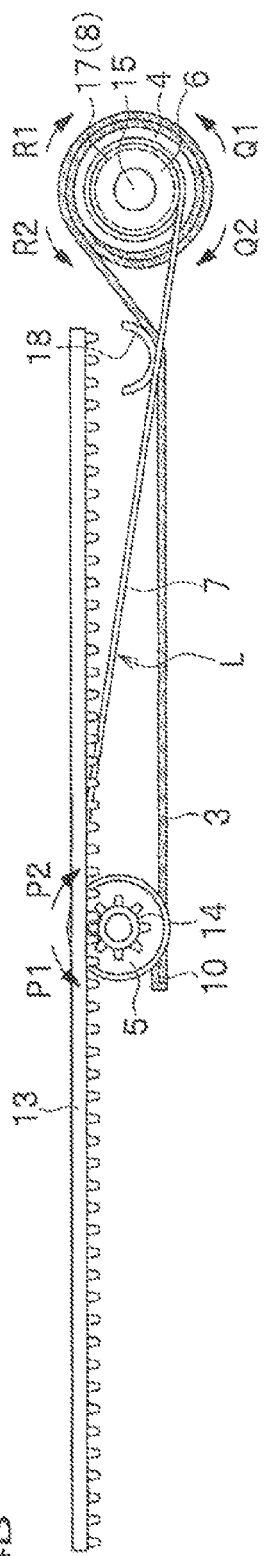
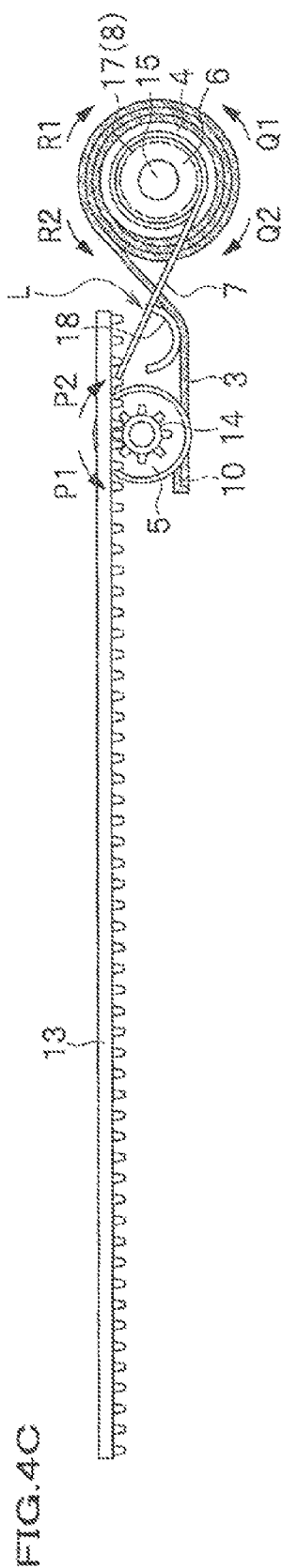

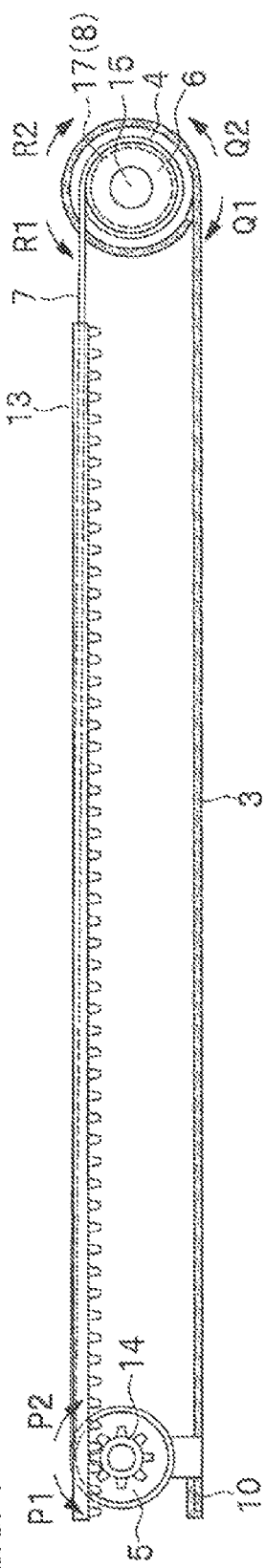
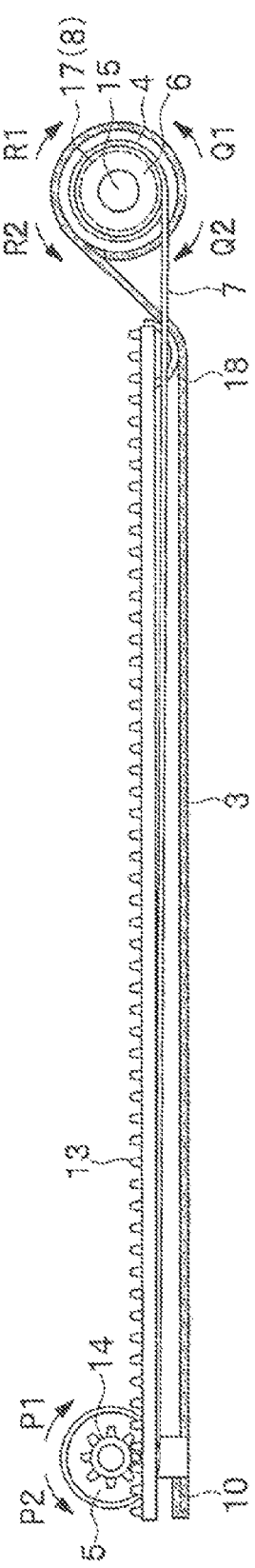
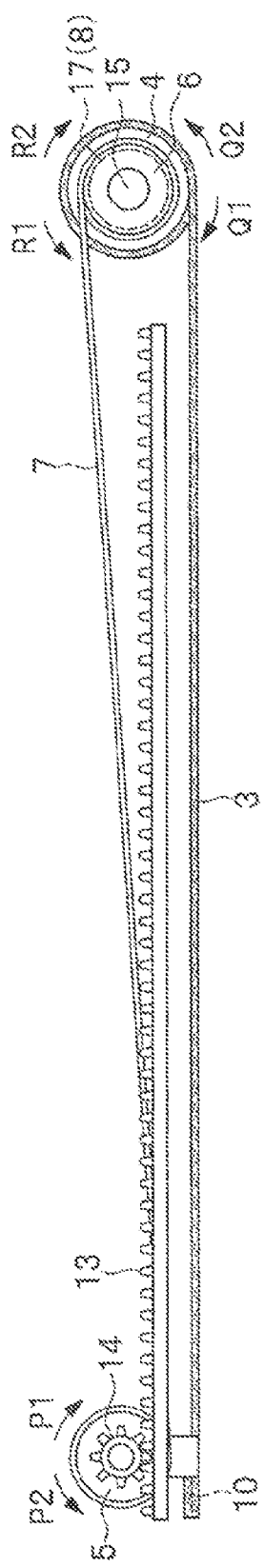

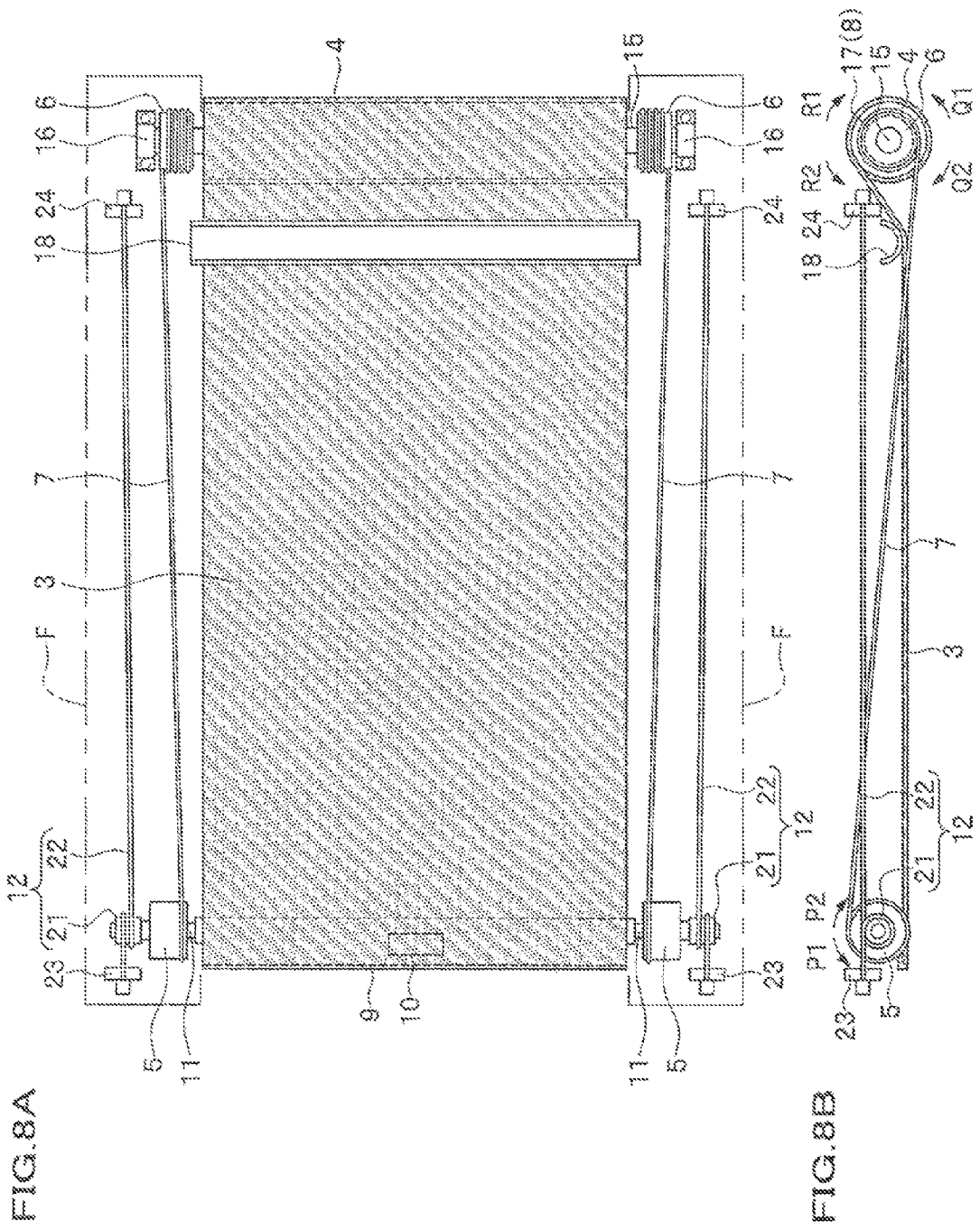

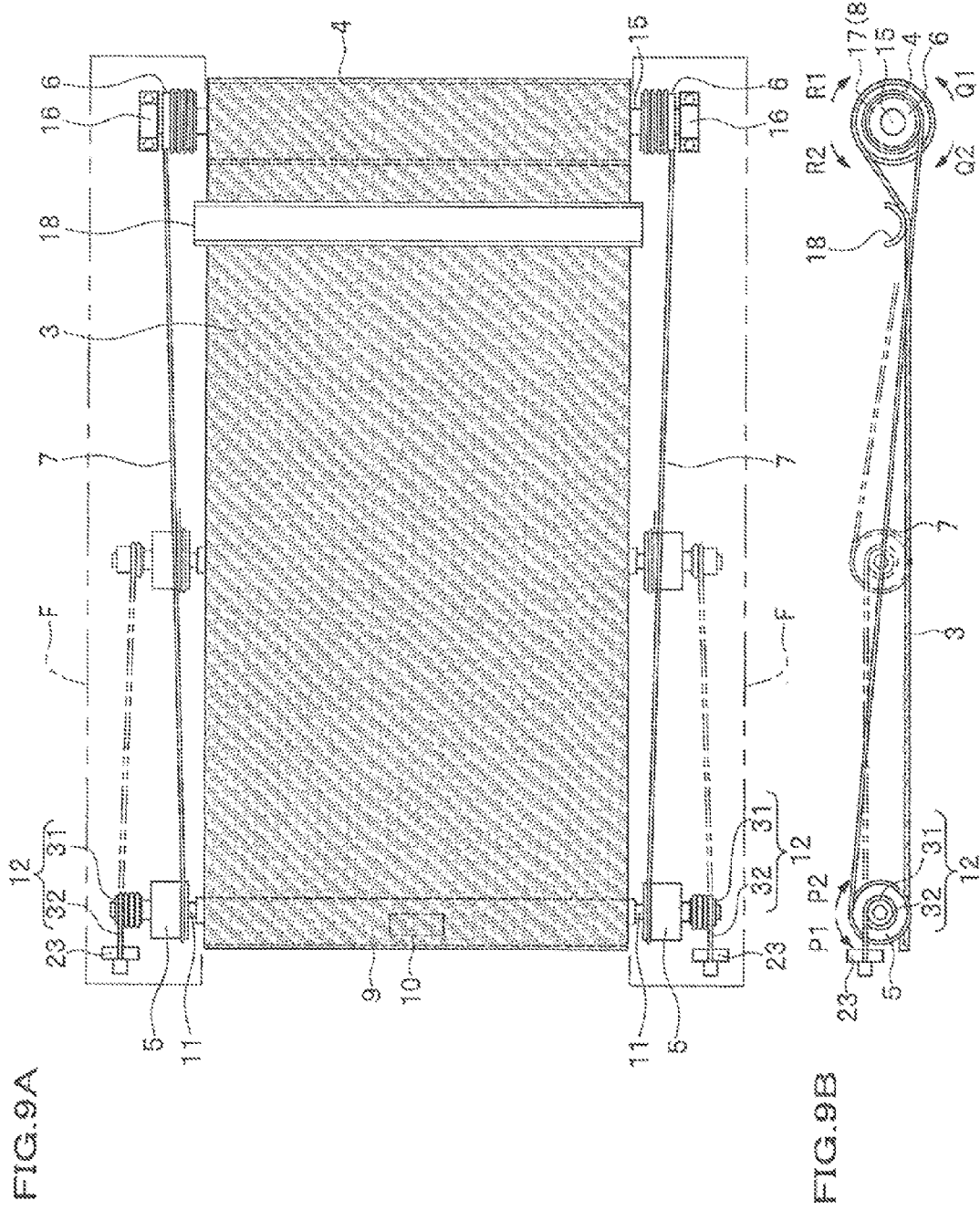

ROLL-UP SHADE APPARATUS FOR VEHICLE

CROSS-REFERENCE TO RELATED APPLICATION

This application claims the foreign priority benefit under 35 U.S.C. §119 of Japanese Patent Application No. 2009-218466 filed on Sep. 24, 2009 and Japanese Patent Application No. 2010-190370 filed on Aug. 27, 2010, the disclosures of which are incorporated herein by reference.

BACKGROUND OF THE INVENTION

1. Field of the Invention

The present invention relates to a roll-up shade apparatus that is attached to an internal opened part of a roof of a vehicle.

2. Description of the Related Art

JP2000-272341A discloses (see paragraph 0006) a conventional example of a shade apparatus which is attached to an internal opened part of a roof of a vehicle and which is a so-called roll-up shade type. Such a shade apparatus includes a shade that opens/closes the internal opened part of the roof, and a retractor that rolls up the shade. JP2000-272341A discloses that, with reference to the reference numerals used in this patent document, a blind web (a shade) at its each leading-end side and a roll-up reel (retractor) at its each end are linked together by a rope which is suspended around a direction changing apparatus, and the rope is pulled by a pulling apparatus in the roll-up direction. Accordingly, the blind web and the rope are always in a force equilibrium condition, so that the blind web can be positioned at a desired position. More specifically, each direction changing apparatus includes direction-changing rolls.

According to JP2000-272341A, when the blind web is fully closed, i.e., when the blind web is positioned at the front end of its opening/closing stroke, it is necessary that a guide shoe that is an attaching portion of the blind web relative to the rope should be positioned rearwardly of the direction-changing roll so as not to interfere with the direction-changing roll. That is, according to JP2000-272341A, the opening dimension of the shade needs to be smaller by an installation space for installing the direction-changing roll frontward of the guide shoe.

Moreover, a pair of right and left pulling apparatuses are provided across the shade, but if positional precision at the right and the left of the structural components of the apparatus is poor, there occurs a difference between tensions applied to the left end and to the right end of the shade, so that the shade may sag, resulting in a poor appearance thereof.

The present invention has been made in order to overcome such problems, and it is an object of the present invention to provide a roll-up shade apparatus for a vehicle which can have a larger open dimension of a shade, and which can reduce a sag of the shade regardless of the positional precision of structural components of the apparatus relative to a vehicle body.

SUMMARY OF THE INVENTION

In order to overcome the foregoing problem, a first aspect of the present invention provides a roll-up shade apparatus for a vehicle including a shade that opens/closes an internal opened part of a roof and a retractor that rolls up the shade from a base end thereof in a rolled manner, the roll-up shade apparatus for a vehicle further including: a pair of first wire drums which are rotatably provided at both sides of a leading end of the shade, and which travel together with the shade while rotating in a wire wind-up direction thereof when receiving manual operative force in a direction to open the shade, and in a wire feed direction when receiving manual operative force in a direction to close the shade; a pair of second wire drums which are coupled to the retractor so as to rotate together with the retractor, and the second drums are rotatably provided at both sides of the retractor to be coaxially with the retractor in such a manner that a wire wind-up direction thereof becomes opposite to a shade wind-up direction of the retractor; and a pair of wire suspended between the respective first wire drums and the respective second wire drums in such a manner that the second wire drums rotate, in a wire feed direction when the first wire drums rotate in a wire wind-up direction, or the second wire drums rotate in a wire wind-up direction when the first wire drums rotate in a wire feed direction.

According to such a structure, it becomes unnecessary to provide such a direction changing apparatus to change the direction of the wire around the front of the shade, so that a larger open dimension of the shade can be secured by what corresponds to such unnecessity.

According to a second aspect of the present invention, the retractor and each of the second wire drums are coupled together through an elastic member which enables a mutual transmission of rotational force between the retractor and the second wire drum, and the elastic member rotatingly urges the retractor in the shade wind-up direction, and urges the second wire drum in the wire wind-up direction, respectively.

According to such a structure, as the elastic member is provided between the retractor and each of the second wire drums, i.e., between the shade and each of the wires, tension is constantly applied between the shade and the wires without the vehicle body intervening. Accordingly, any sagging of the shade can be reduced without being affected by the precision of the attached position of the roll-up shade apparatus relative to the vehicle body.

According to a third aspect of the present invention, the elastic member includes a twisted coil spring.

According to such a structure, as the elastic member includes the twisted coil spring, the structure becomes simple, thereby further simplifying assembling.

According to a fourth aspect of the present invention, the roll-up shade apparatus further includes a shaft which passes all the way through respective axial centers of the retractor and each of the second wire drums and which supports the retractor and the second wire drums.

According to such a structure, a supporting function of the retractor and the second wire drums can be realized by the single shaft alone, thereby reducing the number of parts and simplifying assembling.

According to a fifth aspect of the present invention, the roll-up shade apparatus for a vehicle further includes a pair of pulleys coaxially rotate together with the respective first wire drums as a conversion mechanism that converts manual operative force of the shade into rotational force of each first wire drum; and a pair of conversion wires whose one ends are fixed to a vehicle body and whose other ends are suspended on the respective pulleys in such a manner that the conversion wires are suspended and wound around the respective pulleys such that the conversion wires are fed when the respective first wire drums rotate in the wire wind-up direction, and are wound up when the respective first wire drums rotate in the wire feed direction.

According to such a structure, the first wire drums can be caused to rotate in accordance with the opening/closing distance of the shade 3 with such a simple structure.

According to a sixth aspect of the present invention, the roll-up shade apparatus further includes, as a conversion mechanism that converts manual operative force of the shade into rotational force of the first wire drum, a rack-and-pinion mechanism including a rack gear extendingly provided in an opening/closing direction of the shade and a pinion gear which meshes with the rack gear and which rotates together with the first wire drum.

According to a seventh aspect of the present invention, the pinion gear has a pitch diameter equal to or smaller than a diameter of a wire winding portion of the first wire drum.

According to an eighth aspect of the present invention, each of the first wire drums or each of the second wire drums is formed in a conical trapezoidal shape that gradually reduces a drum diameter in one direction in a vehicle width direction.

According to such a structure, the first wire drums can be caused to rotate in accordance with the opening/closing distance of the shade with a simple structure.

According to the present invention, a larger open dimension of the shade can be secured, and any sagging of the shade can be reduced regardless of the positional precision of structural elements relative to a vehicle body.

Other features and advantages of the present invention will become more apparent from the following detailed description of the invention when taken in conjunction with the accompanying exemplary drawings.

BRIEF DESCRIPTION OF THE DRAWINGS

FIG. 4A is a side view showing the roll-up shade apparatus of the present invention and showing a fully closed condition of a shade.

FIG. 4B is a side view showing the roll-up shade apparatus of the present invention and showing a half-opened condition of the shade.

FIG. 4C is a side view showing the roll-up shade apparatus of the present invention and showing a fully opened condition of the shade.

FIG. 5A is a side view showing a modified example of the present invention relating to how to suspend a shade and a wire.

FIG. 5B is a side view showing another modified example of the present invention relating to how to suspend a shade and a wire.

FIG. 5C is a side view showing the other modified example of the present invention relating to how to suspend a shade and a wire.

FIG. 8A is a plan view showing a modified example of the present invention relating to a conversion mechanism.

FIG. 8B is a side view showing the first modified example of the present invention relating to the conversion mechanism.

FIG. 9A is a plane view showing the second modified example of the present invention relating to the conversion mechanism.

FIG. 9B is a side view showing the second modified example of the present invention relating to the conversion mechanism.

DETAILED DESCRIPTION OF THE PREFERRED EMBODIMENT

Figure 1:
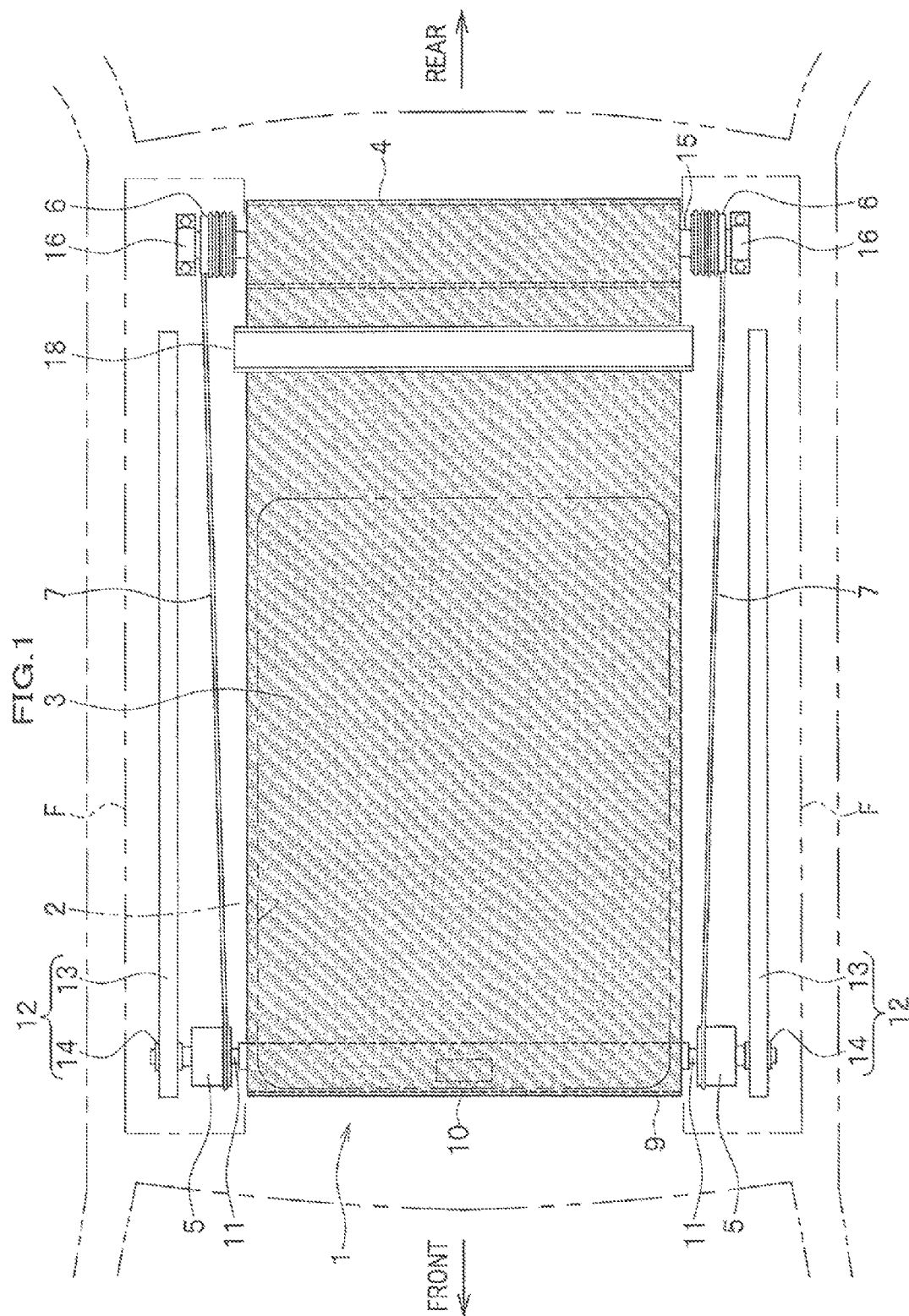
FIG. 1 is a plan view showing a roll-up shade apparatus according to a present invention.

As shown in FIG. 1, a roll-up shade apparatus 1 of the present invention is an apparatus for daylighting/shading at an internal opened part 2 formed in a roof of a vehicle, more specifically, in a ceiling of a vehicle compartment. This roll-up shade apparatus 1 includes a shade 3 that opens/closes the internal opened part 2, and a retractor 4 that rolls up the shade 3 from its base-end (rear-end). In general, a glass panel or glass panels and the like of a sunroof apparatus are attached above the roll-up shade apparatus 1, but such panels are omitted in the figure.

The structure of the shade 3 is not limited to any particular one, but as a basic layered structure of the shade 3, it is general that a basal layer is sandwiched between skin layers. Needless to say, the shade 3 is so formed as to be a thin cloth having a flexibility that permits the shade 3 to be rolled up by the refractor 4 even though the multilayered structure is employed. Examples of the skin layer include synthetic fibers, natural fibers, and leathers, and examples of the basal layer include fiber materials, synthetic resins, and a mixture of fibers with synthetic resins.

The retractor 4 is formed in a cylindrical shape, and is rotatably arranged rearwardly of the internal opened part 2 with an axial direction of the retractor 4 being aligned with a vehicle width direction. The retractor 4 has a circumference surface where the base end of the shade 3 is attached. As shown in FIGS. 4A to 4C, provided ahead of the retractor 4 is a shade holding member 18 which is in contact with and holds an upper face of the shade 3 so as to change its extending direction from a horizontal direction to an inclined direction that is substantially parallel to the tangent line of the retractor 4.

Figure 2:
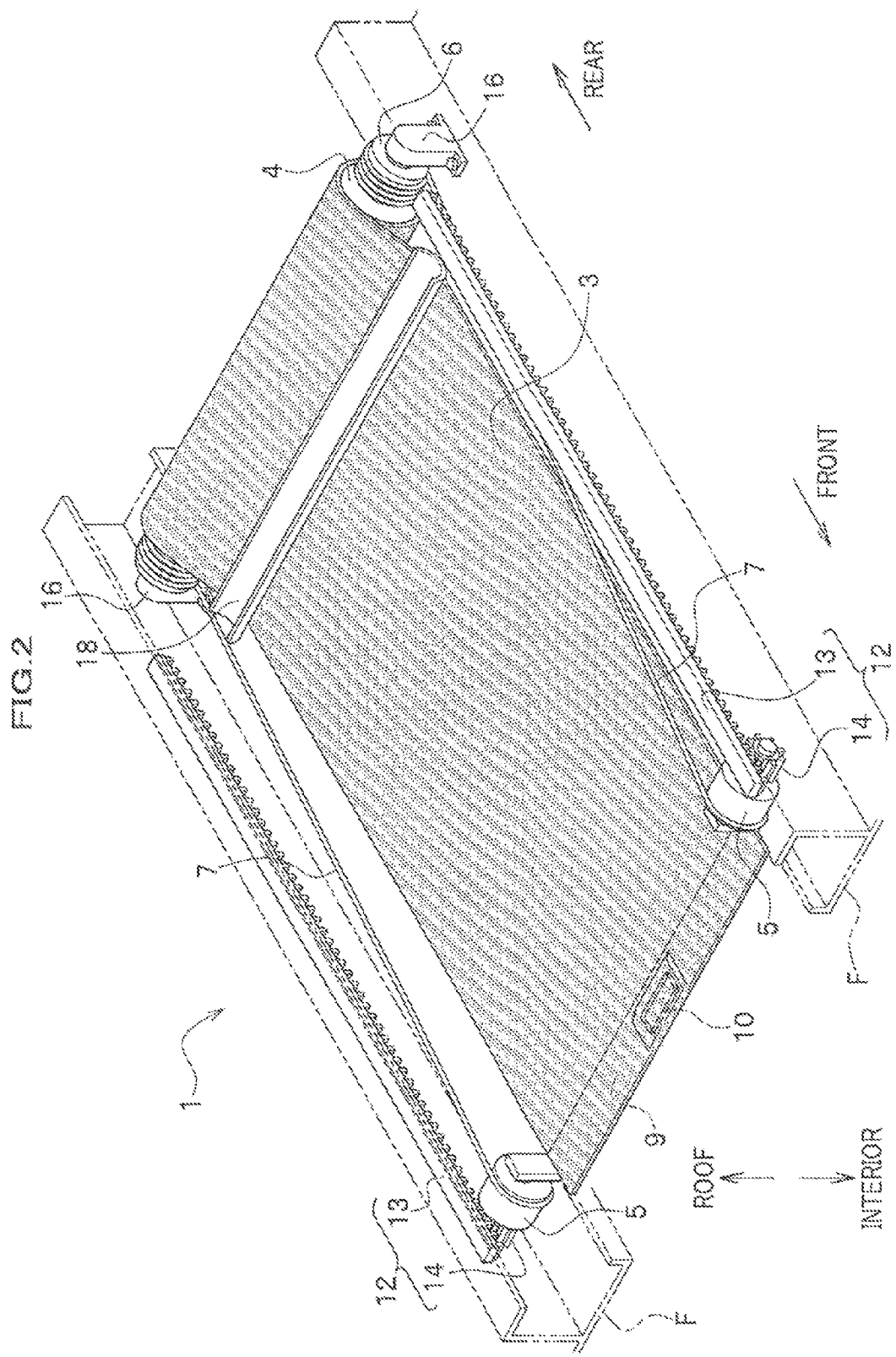
FIG. 2 is a perspective view showing an appearance of the roll-up shade apparatus of the present invention.

In FIGS. 1 and 2, a reference symbol F stands for a guide frame which is so provided as to extend along each side of the internal opened part 2 and which is fixed to a body frame (not shown). Each guide frame F has a function of for example, guiding a slide shoe (not shown) of the shade 3 and a slide shoe (not shown) of the glass panel of the sunroof apparatus, and may be formed of an extruded aluminum alloy, for example. In this embodiment, the guide frame F is used as a fixing member for a rack gear 13, a bearing 16, etc to be discussed later.

In FIGS. 1 to 4C, the roll-up shade apparatus 1 of the present invention has first wire drums 5 which are rotatably provided at respective sides of the leading end of the shade 3, and which move together with the movement of the shade 3 while rotating in a wire wind-up direction (a direction P1) when receiving manual operative force in the open direction of the shade 3 and in a wire feed direction (a direction P2) when receiving manual operative force in the closing direction of the shade 3. The roll-up shade apparatus 1 also has second wire drums 6 which are so coupled to the retractor 4 as to be rotatable together with the retractor 4, such that the wire drums 6 are attached at respective sides of the retractor 4 to be coaxial with the retractor 4 so as to rotate in such a way that a wire wind-up direction (a direction Q1) of the wire drums 6 becomes opposite to a shade wind-up direction (a direction R1) of the retractor 4. The roll-up shade apparatus 1 further has wires 7 which are suspended between a set of the wire drum 5 and the wire drum 6 (on the right side of the vehicle, for example) and between another set of the wire drum 5 and the wire drum 6 (on the left side of the vehicle, for example) respectively, in such a way that the second wire drums 6 rotate in a wire feed direction (a direction Q2) or in the wire wind-up direction (the direction Q1), respectively when the first wire drums 5 rotate in the wire wind-up direction (the direction P1) or in the wire feed direction (the direction P2). In this embodiment, provided between the retractor 4 and the second wire drums 6 are elastic members 8 which enables mutual transmission of rotational force between the retractor 4 and the second wire drums 6, and which rotatingly urge the retractor 4 in the shade wind-up direction (the direction R1) and rotatingly urge the second wire drums 6 in the wire wind-up direction (the direction Q1).

More specifically, a stay 9 made of a rigid body is provided to extend across the leading end of the shade 3 in the vehicle width direction. A handle 10 such as a recessed pull is provided at the lower face (see the arrowed "INTERIOR" side of FIG. 2) of the stay 9. Support shafts 11 are protrudingly provided at both ends of the stay 9 with an axial direction in the vehicle width direction, and the first wire drums 5 are rotatably attached to respective support shafts 11.

When an occupant reaches the handle 10 and manually opens/closes the shade 3, the first wire drums 5 move back and forth together with the movement of the shade 3. At this time, it is necessary to cause the first wire drums 5 to rotate so that there would be no difference between the travel distance and the rotation distance by sliding or the like. Accordingly, as a conversion mechanism 12 which converts manual operative force to the shade 3 into rotational force of the first wire drums 5, provided in this embodiment is a rack-and-pinion mechanism including rack gears 13 that are extendingly provided in the opening/closing direction of the shade 3 and pinion gears 14 which mesh with respective rack gears 13 and which rotate together with respective first wire drums 5.

The rack gear 13 is attached to the guide frame F in such a way that a gear portion is directed downwardly, for example. The pinion gear 14 is coaxially provided at the external side of the first wire drum 5. Accordingly, as the shade 3 opens/closes, the pinion gears 14 can rotate without any sliding in accordance with the backward/forward travel of the shade 3, and a rotational distance of each first wire drum 5 in accordance with opening/closing distance of the shade 3 can be secured. Note that the pinion gear 14 has a pitch diameter that is equal to or smaller than a diameter of a wire winding portion of the first wire drum 5.

The wires 7 are suspended between the wire drums 5 and 6 on the respective sets, so as to apply tension therebetween, enabling the second wire drums 6 to rotate in the wire feed direction (the direction Q2) or in the wire wind-up direction (the direction Q1) when the first wire drums 5 rotate in the wire wind-up direction (the direction P1) or in the wire feed direction (the direction P2), respectively, as explained above. As shown in FIG. 4A, when each of the first wire drums 5 is located at the front end of the travel stroke, the longest straight line part L is formed in the wire 7; but when the first wire drum 5 travels toward the rear as shown in FIGS. 4B, 4C and winds up the wire 7, not only the first straight line part L of the wire 7 is wound up by the first wire drum 5 but also the second wire drum 6 rotates in the direction Q2 to feed the wire 7. In this fashion, the first and second wire drums 5, 6 are designed to have respective drum diameters that make the wire wind-up amount of the wire 7 larger than the travel distance of the first wire drum 5, i.e., the opening/closing distance of the shade 3.

Figure 3:
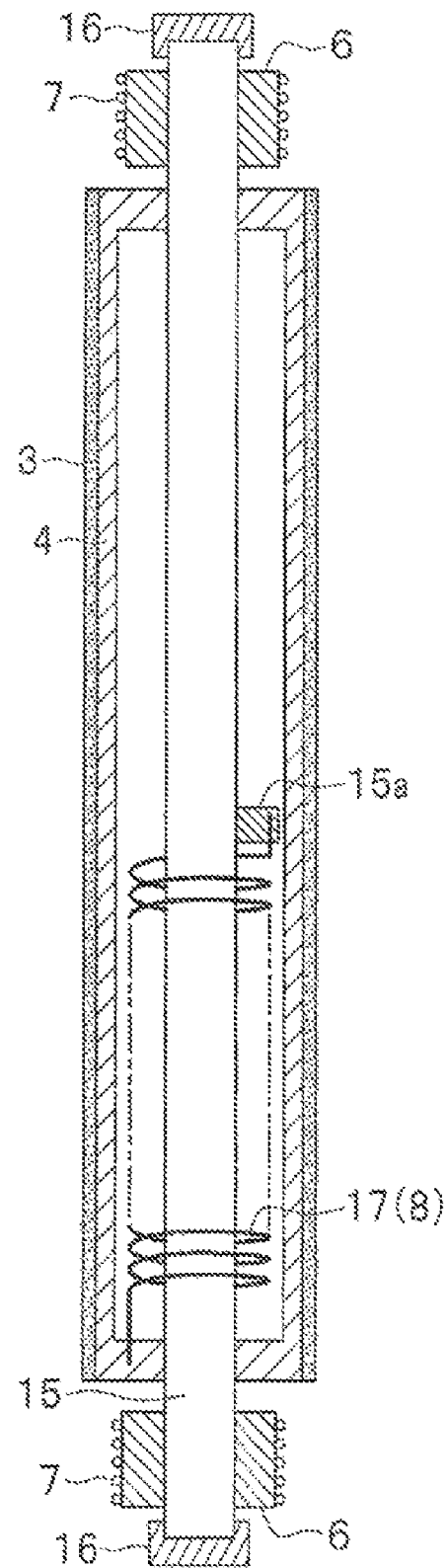
FIG. 3 is a planar cross-sectional view showing an internal structure of a retractor.

As explained above, the second wire drum 6 is coaxially provided with the retractor 4. As shown in FIG. 3, the retractor 4 and the second wire drums 6 are supported together by a shaft 15 which passes all the way through respective axial centers thereof. Both ends of the shaft 15 are rotatably supported by, for example, respective bearings 16 fixed to the guide frame F. The second wire drums 6 are fixed to the shaft 15 so as to rotate together with the shaft 15. On the other hand, the retractor 4 is rotatably attached to the shaft 15. That is, the retractor 4 and the second wire drum 6 are rotatable relatively to each other via the shaft 15.

A twisted coil spring 17 in a twisted condition is provided as the foregoing elastic member 8 between the retractor 4 and the second wire drum 6. In FIG. 3, the twisted coil spring 17 is retained in the retractor 4 coaxially with the shaft 15. The twisted coil spring 17 has one end latched with the internal surface of the retractor 4, and has another end latched with a latching part 15a of the shaft 15. The twisted coil spring 17 urges the retractor 4 and the second wire drums 6 in opposite directions to each other around the shaft 15, and as shown in FIGS. 4A to 4C, a rotational moment in the direction R1 that is a wind-up direction of the shade 3 is applied to the retractor 4, and a rotational moment in the direction Q1 that is a wind-up direction of the wire 7 is applied to the second wire drums 6.

Next, an explanation will be given of an effect of the roll-up shade apparatus 1 employing the foregoing structure.

<When Opening the Shade 3>

From the condition shown in FIG. 4A in which the shade 3 is fully closed, as an occupant puts his/her hand on the handle 10 and pulls the shade 3 backward as shown in FIG. 4B, the first wire drums 5 and the pinion gears 14 travel backward together with the leading end portion of the shade 3, and at this time, as the pinion gears 14 meshing with respective rack gears 13 rotate, the first wire drums 5 rotate in the direction P1, and travels backward while winding up the wire 7.

As explained above, because the wind-up amount of the wire 7 is set to be larger than the travel distance of the first wire drums 5, in response to the wind-up operation of the first wire drums 5, the respective second wire drums 6 rotate in the direction Q2 so as to feed the respective wires 7. The rotational force of each second wire drum 6 in the direction Q2 is transmitted to the retractor 4 through the twisted coil spring 17. That is, as the second wire drums 6 rotate in the direction Q2, the retractor 4 rotates in the direction R1 while being pulled by the twisted coil spring 17, and winds up the shade 3.

During a period from the condition shown in FIG. 4A to the condition shown in FIG. 4C, because of the urging force by the twisted coil spring 17, a rotational moment in the direction Q1 that is a direction to wind up the wire 7 is applied to each second wire drum 6, so that the straight line part L of the wire 7 is always tensioned, and the wire 7 does not sag. Likewise, a rotational moment in the direction R1 that is a direction to wind up the shade 3 is applied to the retractor 4, so that the shade 3 is constantly tensioned, and the shade 3 does not sag.

<When Closing Shade 3>

From a condition shown in FIG. 4C, as the shade 3 is pulled forward, the first wire drums 5 and the pinion gears 14 travel forward together with the leading end portion of the shade 3, and at this time, as the pinion gears 14 meshing with respective rack gears 13 rotate inversely, the first wire drums 5 rotate in the direction P2, and travel forward while feeding respective wires 7.

On the other hand, as the shade 3 is pulled forward, the retractor 4 rotates in the direction R2 so that the shade 3 is fed.

The rotational force of the retractor 4 in the direction R2 is transmitted to the second wire drums 6 through the twisted coil spring 17. That is, as the retractor 4 rotates in the direction R2, the second wire drums 6 rotate in the direction Q1 while being pulled by the twisted coil spring 17, and among the wire 7 fed from each first wire drum 5, portions other than a portion forming the straight line part L are wound up.

During a period from the condition shown in FIG. 4C to the condition shown in FIG. 4A, because of the urging force by the twisted coil spring 17, a rotational moment in the direction Q1 that is a direction to wind up the wire 7 is applied to each second wire drum 6, so that the straight line part L of the wire 7 is constantly tensioned, and the wire 7 does not sag. Likewise, a rotational moment in the direction R1 that is a direction to wind up the shade 3 is applied to the retractor 4, so that the shade 3 is constantly tensioned, and the shade 3 does not sag.

As explained above, according to the roll-up shade apparatus 1 of the present invention, it becomes unnecessary to provide such a direction changing apparatus to change the direction of the wire around the front of the shade 3 as disclosed in JP2000-272341A, so that a larger open dimension of the shade 3 can be secured by what corresponds to such elimination of the above direction changing apparatus.

Moreover, JP2000-272341A employs a structure in which the wire pulling apparatuses are provided between the vehicle body and each wire, and depending on the precision of attached positions of the right and left pulling apparatuses relative to the vehicle body, the tension to the left edge of the shade and the tension to the right edge thereof easily become different, so that the shade is likely to sag. In contrast, according to the present invention, as the elastic member 8 is provided between the retractor 4 and the second wire drums 6, i.e., between the shade 3 and the wires 7, tension is constantly applied between the shade 3 and the wires 7 without the vehicle body intervening. Accordingly, any sagging of the shade 3 can be reduced without being affected by the precision of the attached position of the roll-up shade apparatus 1 relative to the vehicle body.

Also, according to this embodiment, as a structure of having the shaft 15 passing all the way through the respective axial centers of the retractor 4 and the second wire drums 6, thereby supporting the retractor 4 and the second wire drums 6 is employed, a supporting function of the retractor 4 and the second wire drums 6 can be realized by the single shaft 15 alone, thereby reducing the number of parts and simplifying assembling. Further, as the elastic member 8 includes the twisted coil spring 17, such a simple structure results in further simplification of assembling.

As the conversion mechanism 12 that converts manual operative force of the shade 3 into rotational force of the first wire drums 5, the rack-and-pinion mechanism is employed which includes the rack gears 13 extendingly provided in the opening/closing direction of the shade 3 and the pinion gears 14 meshing with the respective rack gears 13 and rotating together with the respective first wire drums 5. Accordingly, the first wire drums 5 can be caused to rotate in accordance with the opening/closing distance of the shade 3 with a simple structure.

<Modified Examples of Suspending Shade 3 and Wire 7>

FIGS. 5A to 5C show modified examples of the roll-up shade apparatus 1 relating to how to suspend the shade 3 and the wire 7. FIG. 5A shows an example in which winding/feeding of the wire 7 by the second wire drum 6 is carried out from the upper part of the second wire drum 6, and winding/feeding of the shade 3 by the retractor 4 is carried out from the lower part of the retractor 4. According to examples shown in FIGS. 5B and 5C, the gear portion of the rack gear 13 is directed upwardly to set the rotational direction of the first wire drums 5 to be reversed from the case shown in FIGS. 4A to 4C, and winding/feeding of the wire 7 by the first wire drum 5 is carried out from the lower part of the first wire drum 5. In those examples, FIG. 5B shows the example in which winding/feeding of the wire 7 by the second wire drum 6 is carried out from the lower part of the second wire drum 6, and winding/feeding of the shade 3 by the retractor 4 is carried out from the upper part of the retractor 4. FIG. 5C shows the example in which winding/feeding of the wire 7 by the second wire drum 6 is carried out from the upper part of the second wire drum 6, and winding/feeding of the shade 3 by the retractor 4 is carried out from the lower part of the retractor 4. According to such modified examples shown in FIGS. 5A to 5C, the same effect as that of the structure shown in FIGS. 4A to 4C can be accomplished.

<Modified Example of Attaching Twisted Coil Spring 17>

Figure 6:
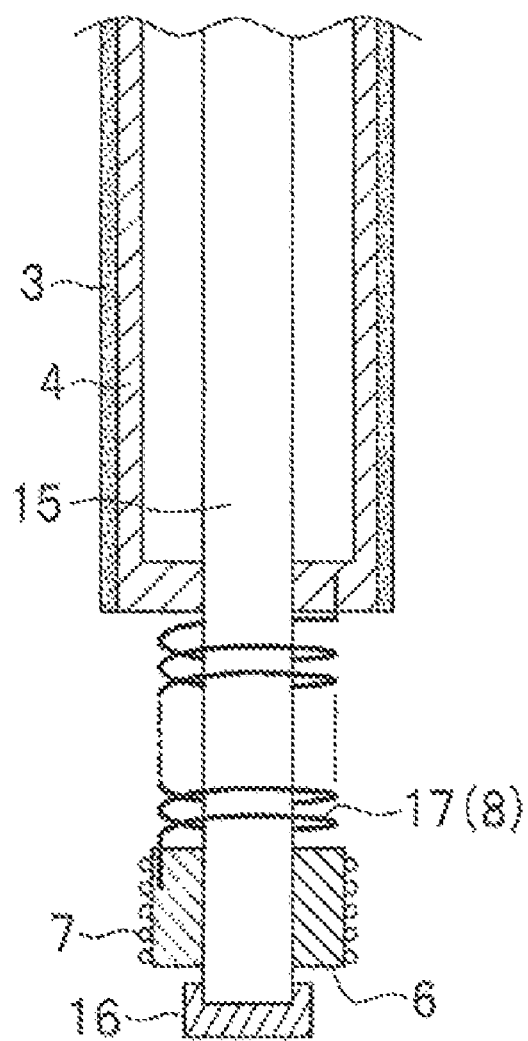
FIG. 6 is a planar cross-sectional view showing a modified example of the present invention relating to how to attach a twisted coil spring.

FIG. 6 shows a modified example relating to how to attach the twisted coil spring 17. In this example, the retractor 4 and the second wire drums 6 are both rotatably attached to the shaft 15, and the twisted coil springs 17 are hooked between the retractor 4 and respective second wire drums 6. Alternatively, the retractor 4 may be fixed relative to the shaft 15 that is rotatably supported by the bearings 16, and the second wire drums 6 may be rotatably attached to the shaft 15, and then the twisted coil springs 17 are hooked between the retractor 4 and respective second wire drums 6. According to such configurations, each twisted coil spring 17 can rotatingly urge the retractor 4 in the direction to wind up the shade (the direction R1) and can rotatingly urge the second wire drum 6 in the direction to wind up the wire 7 (the direction Q1) so as to enables mutually transmission of rotational force between the retractor 4 and the second wire drum 6.

<Modified Example Relating to Shape of First or Second Wire Drum 5, 6>

Figure 7:
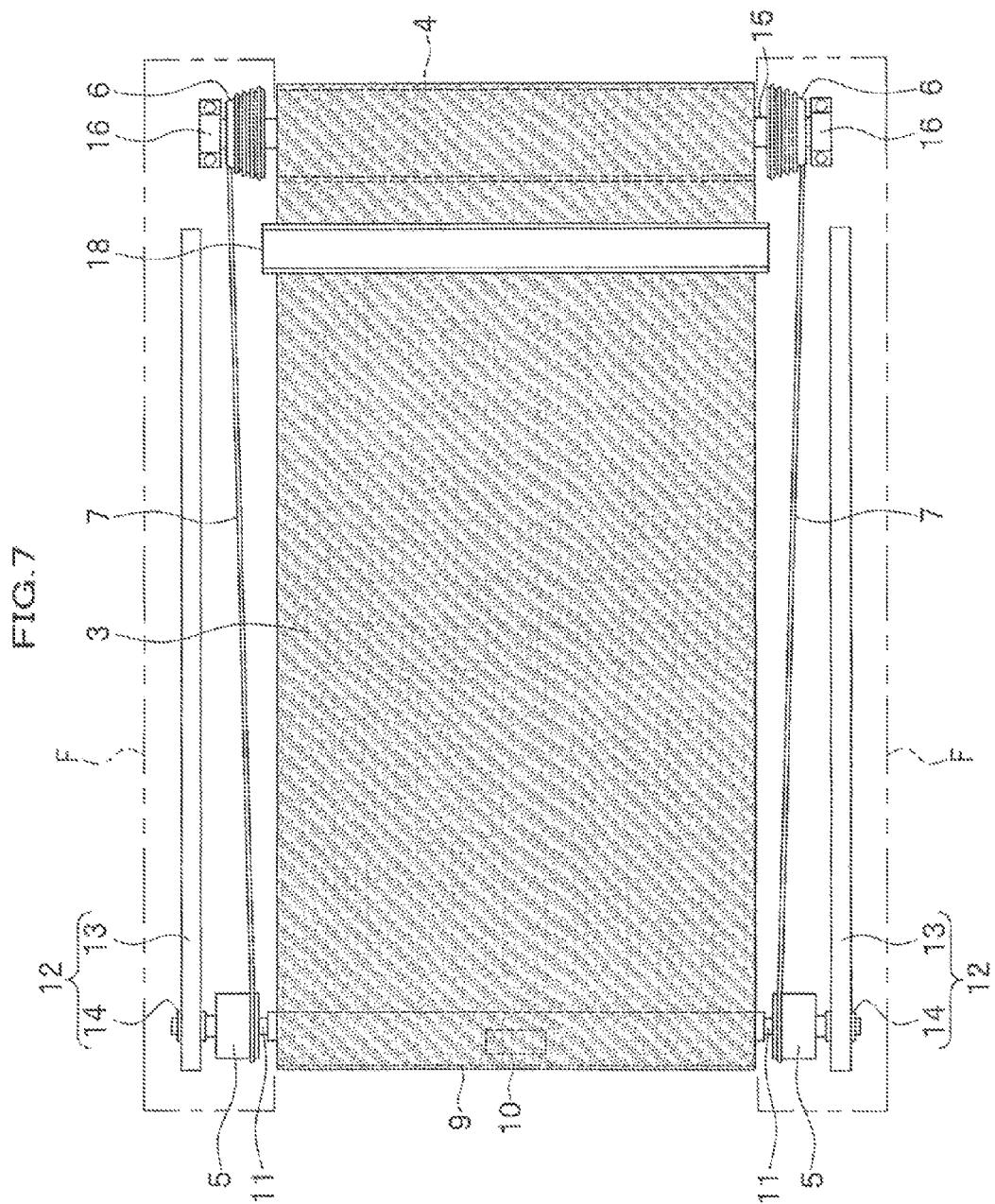
FIG. 7 is a plan view showing a modified example of the present invention relating to a shape of a first wire drum or that of a second wire drum.

As shown in FIG. 7, if the first wire drum 5 or the second wire drum 6 is formed in a conical trapezoidal shape with a drum diameter gradually reduced in one direction in the vehicle width direction, increase/decrease of the rotational speed of the retractor 4 due to increase/decrease of the wounded diameter of the shade 3 by the retractor 4, i.e., increase/decrease of the rotational speed of the second wire drum 6 coupled to the retractor 4 through the twisted coil spring 17 can be absorbed by increase/decrease of the above drum diameter. Accordingly, the travel distance of the shade 3 can substantially match the travel distance of the wire 7 per rotation of the retractor 4 across the whole opening/closing stroke of the shade 3. In FIG. 7, the second wire drums bare each formed in a conical trapezoidal shape, but the first wire drums 5 may be each formed in a conical trapezoidal shape, alternatively. Even in the case of the first wire drum 5 and the second wire drum 6 both formed in a cylindrical shape as shown in FIG. 1, it is possible for the twisted coil spring 17 to absorb increase/decrease of the rotational speed of the retractor 4, but the twisted coil spring 17 is likely to be large so as to satisfy a spring structure in consideration of that absorption. In contrast, like this modified example, if the increase/decrease of the rotational speed of the retractor 4 is absorbed by forming the first wire drum 5 or the second wire drum 6 in a conical trapezoidal shape, it becomes unnecessary for the twisted coil spring 17 to have a function of absorbing such increase/decrease of the rotational speed, so that the small twisted coil spring 17 becomes fine, thereby reducing the weight of the roll-up shade apparatus 1 and the cost thereof.

<First Modified Example Relating to Conversion Mechanism 12>

FIG. 8 shows a first modified example relating to the conversion mechanism 12. The conversion mechanism 12 employs a structure in which pulleys 21 are attached to respective first wire drums 5 so as to coaxially rotate together with respective first wire drum 5, and wires 22 are suspended on the respective pulleys 21. Both ends of each wire 22 are fixed to respective front and rear fixing brackets 23, 24. The fixing brackets 23, 24 are attached to, for example, the guide frame F. As the pulleys 21 and the wires 22, any structural members which produce no slipping therebetween may be used. According to such a conversion mechanism 12, when the pulleys 21 travel together with opening/closing of the shade 3, the pulleys 21 can rotate without slipping because of their frictions against the respective wires 22, so that the first wire drums 5 can be caused to rotate in accordance with the opening/closing distance of the shade 3.

<Second Modified Example Relating to Conversion Mechanism 12>

FIG. 9 shows a second modified example relating to the conversion mechanism 12. The conversion mechanism 12 of FIG. 9 has the same structure as that of FIG. 8 in that the pulleys 21 are attached to the respective first wire drums 5 so as to coaxially rotate together with respective first wire drum 5. A difference in structure between the first and second modified examples is that the conversion mechanism 12 of FIG. 9 employs a structure in which one end of each wire 32 (also referred to as a "conversion wire") is fixed to the vehicle body and the other end of the conversion wire 32 is suspended on the correspond pulley 31, contrary to the conversion mechanism 12 of FIG. 8 which employs a structure in which the wires 22 are suspended on the respective pulleys 21 and then both the ends of the wires 22 are fixed to the vehicle body (specifically, fixed to the respective front and rear fixing brackets 23, 24). As for the vehicle body, fixing members fixed to the vehicle body are also referred to as "the vehicle body" herein, and FIG. 9 shows a case in which one end of each conversion wire 32 is fixed to the corresponding fixing bracket 23 when located frontward of the vehicle body. The other end of each conversion wire 32 is fixed around a circumferential face of the corresponding pulley 32. Any winding pulley that has a structure to wind the conversion wire 32 in spirals on the circumferential face thereof may be used as the pulley 32. Of course, the pulley 31 and the conversion wire 32 should have a structure that causes no slippage therebetween, and a belt-like member may also be included to be used as the conversion wire 32.

The conversion mechanism 12 of the second modified example will be described hereinafter.

<When Opening Shade 3>

While moving backward in accordance with the movement of the shade 3, each first wire drum 5 is caused to rotate in the direction P1 by a tensile force of each conversion wire 32 whose one end is fixed to the corresponding fixing bracket 23, so that the wire 7 is wound up. At the same time, each pulley 31 feeds the corresponding conversion wire 32 in the direction P1.

<When Closing Shade 3>

As described above, when the shade 3 is closed, the shade 3 is pulled frontward so that the retractor 4 rotates in the direction R2 to feed the shade 3, and a rotational force in the direction R2 of the retractor 4 is transmitted to the second wire drums 6 via the twisted coil springs 17, whereby the second wire drums 6 rotate in the direction Q1. Due to a urging force of the twisted coil spring 17, a rotational moment is applied to the second wire drum 6 in the direction Q1, so that a tensile force is constantly applied on the straight line of the wire 7, and this tensile force of the wire 7 causes the first corresponding wire drum 5 to rotate in the direction P2 and move frontward, thereby to feed the wire 7. At the same time, the pulleys 31 rotate in the direction P2, thereby to wind up the conversion wire 32.

As described above, since the conversion mechanism 12 employs a simple structure that includes the pulleys 31 coaxially rotating together with the respective first wire drums 5 and the conversion wires 32 whose one ends are fixed to the vehicle body (the fixing brackets 23) and whose other ends are suspended and wound around the respective pulleys 31 in such a manner that the conversion wires 32 are fed when the respective first wire drums 5 rotate in the wire wind-up direction (the direction P1), and are wound up when the respective first wire drums 5 rotate in the wire feed direction (the direction P2), the first wire drums 5 can be caused to rotate in accordance with the opening/closing distance of the shade 3 with such a simple structure. Of course, the conversion mechanism 12 of the second modified example may also be applicable to the suspending manners of the shade 3 and the wires 7 as shown in FIG. 5A to 5C.

<Modified Example Relating to Tensioning Unit for Wire 7>

In the above-explained embodiment, as the tensioning unit for applying tension to the wire 7, the elastic member 8 is provided between the retractor 4 and the second wire drum 6, but other kinds of tensioning unit may be used. For example, the wire 7 itself is made of a wire with elasticity. Also, it is not illustrated in the figure but the shaft 15 may be configured to travel in the backward/forward direction of the vehicle, and an elastic member may be provided between the shall 15 and the vehicle body so as to urge the shaft 15 backward of the vehicle body. In both the cases of said modified examples, the retractor 4 and the second wire drums 6 are coupled together by means of respective couplers (not shown) so as to be rotatable together with each other.

Furthermore, the layout of each structural element, the shape thereof, and the number of each kind of structural elements are not limited to the foregoing embodiment, and the present invention can be changed and modified in various forms.

The embodiment according to the present invention has been explained as aforementioned. However, the embodiment of the present invention is not limited to those explanations, and those skilled in the art ascertain the essential characteristics of the present invention and can make the various modifications and variations to the present invention to adapt it to various usages and conditions without departing from the spirit and scope of the claims.

What is claimed is:

1. A roll-up shade apparatus for a vehicle comprising a shade that opens/closes an internal opened part of a roof and a retractor that rolls up the shade from a base end thereof in a rolled manner, the roll-up shade apparatus for a vehicle further comprising:

a pair of first wire drums which are rotatably provided at both sides of a leading end of the shade, and which travel together with the shade while rotating in a wire wind-up direction thereof when receiving manual operative force in a direction to open the shade, or rotating in a wire feed direction thereof when receiving manual operative force in a direction to close the shade;

a pair of second wire drums which are coupled to the retractor so as to rotate together with the retractor, the second wire drums rotatably provided at both sides of the retractor to be coaxially with the retractor in such a manner that a wire wind-up direction thereof becomes opposite to a shade wind-up direction of the retractor; and a pair of wires suspended between the respective first wire drums and the respective second wire drums in such a manner that the second wire drums rotate in a wire feed direction when the first wire drums rotate in a wire wind-up direction, or the second wire drums rotate in a wire wind-up direction when the first wire drums rotate in a wire feed direction.

2. The roll-up shade apparatus for a vehicle according to claim 1, wherein the retractor and each of the second wire drums are coupled together through an elastic member which enables a mutual transmission of rotational force between the retractor and the second wire drum, and the elastic member rotatingly urges the retractor in the shade wind-up direction, and urges the second wire drum in the wire wind-up direction, respectively.

3. The roll-up shade apparatus for a vehicle according to claim 2, wherein the elastic member comprises a twisted coil spring.

4. The roll-up shade apparatus for a vehicle according to claim 1, further comprising a shaft which passes all the way through respective axial centers of the retractor and each of the second wire drums and which supports the retractor and the second wire drums.

5. The roll-up shade apparatus for a vehicle according to claim 2, further comprising a shaft which passes all the way through respective axial centers of the retractor and each of the second wire drums and which supports the retractor and the second wire drums.

6. The roll-up shade apparatus for a vehicle according to claim 3, further comprising a shaft which passes all the way through respective axial centers of the retractor and each of the second wire drums and which supports the retractor and the second wire drums.

7. The roll-up shade apparatus according to claim 1, further comprising a pair of pulleys coaxially rotate together with the respective first wire drums as a conversion mechanism that converts manual operative force of the shade into rotational force of each first wire drum; and a pair of conversion wires whose one ends are fixed to a vehicle body and whose other ends are suspended on the respective pulleys in such a manner that the conversion wires are suspended and wound around the respective pulleys such that the conversion wires are fed when the respective first wire drums rotate in the wire wind-up direction, and are wound up when the respective first wire drums rotate in the wire feed direction.

8. The roll-up shade apparatus according to claim 2, further comprising a pair of pulleys coaxially rotate together with the respective first wire drums as a conversion mechanism that converts manual operative force of the shade into rotational force of each first wire drum; and a pair of conversion wires whose one ends are fixed to a vehicle body and whose other ends are suspended on the respective pulleys in such a manner that the conversion wires are suspended and wound around the respective pulleys such that the conversion wires are fed when the respective first wire drums rotate in the wire wind-up direction, and are wound up when the respective first wire drums rotate in the wire feed direction.

9. The roll-up shade apparatus according to claim 3, further comprising a pair of pulleys coaxially rotate together with the respective first wire drums as a conversion mechanism that converts manual operative force of the shade into rotational force of each first wire drum; and a pair of conversion wires whose one ends are fixed to a vehicle body and whose other ends are suspended on the respective pulleys in such a manner that the conversion wires are suspended and wound around the respective pulleys such that the conversion wires are fed when the respective first wire drums rotate in the wire wind-up direction, and are wound up when the respective first wire drums rotate in the wire feed direction.

10. The roll-up shade apparatus for a vehicle according to claim 1, further comprising, as a conversion mechanism that converts manual operative force of the shade into rotational force of the first wire drum, a rack-and-pinion mechanism including a rack gear extendingly provided in an open/closing direction of the shade and a pinion gear which meshes with the rack gear and which rotates together with the first wire drum.

11. The roll-up shade apparatus for a vehicle according to claim 2, further comprising, as a conversion mechanism that converts manual operative force of the shade into rotational force of the first wire drum, a rack-and-pinion mechanism including a rack gear extendingly provided in an open/closing direction of the shade and a pinion gear which meshes with the rack gear and which rotates together with the first wire drum.

12. The roll-up shade apparatus for a vehicle, according to claim 3, further comprising, as a conversion mechanism that converts manual operative force of the shade into rotational force of the first wire drum, a rack-and-pinion mechanism including a rack gear extendingly provided in an open/closing direction of the shade and a pinion gear which meshes with the rack gear and which rotates together with the first wire drum.

13. The roll-up shade apparatus for a vehicle according to claim 10, wherein the pinion gear has a pitch diameter equal to or smaller than a diameter of a wire winding portion of the first wire drum.

14. The roll-up shade apparatus for a vehicle according to claim 1, wherein each of the first wire drums or each of the second wire drums is formed in a conical trapezoidal shape that gradually reduces a drum diameter in one direction in a vehicle width direction.

15. The roll-up shade apparatus for a vehicle according to claim 2, wherein each of the first wire drums or each of the second wire drums is formed in a conical trapezoidal shape that gradually reduces a drum diameter in one direction in a vehicle width direction.

16. The roll-up shade apparatus for a vehicle according to claim 3, wherein each of the first wire drums or each of the second wire drums is formed in a conical trapezoidal shape that gradually reduces a drum diameter in one direction in a vehicle width direction.

* * * * *